UNITED STATES PATENT OFFICE.

WILLIAM HUFFMAN, OF SALT CITY, KANSAS.

VETERINARY MEDICINE.

SPECIFICATION forming part of Letters Patent No. 279,166, dated June 12, 1883.

Application filed February 27, 1883. (No specimens.)

*To all whom it may concern:*

Be it known that I, WILLIAM HUFFMAN, a citizen of the United States, residing at Salt City, in the county of Sumner and State of Kansas, have invented certain new and useful improvements in medical compounds for the cure of the diseases known as "Texas," "splenic," or "Spanish" fever, "black-leg," and other diseases in cattle; and I do declare the following to be a full, clear, and exact description of.the invention, such as will enable others skilled in the art to which it appertains to make and use the same.

In the preparation of my compound I take eight drams aloes, (of any kind,) Barbadoes preferred; four drams powdered niter; four drams rosin; four drams Castile soap, powdered; three drams ginger; thoroughly pulverize and mix above ingredients; then add fifteen drops oil of cloves, and then dampen the same with one dram "fluid extract hydrangea;" then roll the mixture into a pill about two inches long, and wrap in paper to prevent same from dissolving before it reaches animal's stomach. This is a dose for fully-matured animals, or animals three years old or over. Give the same in the following manner: Pull out the animal's tongue with the hand far enough to allow the pill to be placed back in the animal's mouth and throat as far as the base of the tongue. Repeat dose every twenty-four hours until bowels move freely. Dose for calf six months old, or under, about one-fourth of above dose. Dose for animal over six months old and under two years old, one-third of the dose for fully-matured animal. Dose for animal over two and under three years old, two-thirds of dose for fully-matured animal.

What I claim as new and useful in the cure of the diseases known as "Texas," "splenic," or "Spanish" fever, "black-leg," and other kindred diseases in cattle, is—

A new and useful medical-compound pill composed of aloes, powdered niter, rosin, powdered Castile soap, ginger, oil of cloves, and fluid extract of hydrangea, in the proportions specified.

In testimony whereof I affix my signature in presence of two witnesses.

WILLIAM HUFFMAN.

Witnesses:
 THOMAS GEORGE,
 D. N. CALDWELL.